United States Patent Office 3,022,419
Patented Feb. 20, 1962

3,022,419
PANORAMIC RECEIVERS

Victor Biggi and Jean-Claude Simon, Paris, France, assignors to Compagnie Generale de Telegraphie Sans Fil, a corporation of France Filed June 14, 1960, Ser. No. 35,919
Claims priority, application France June 19, 1959
1 Claim. (Cl. 250—20)

The present invention relates to a system for detecting radio signals over a frequency range extending from a few tens of megacycles to one or more thousands of megacycles.

In known systems, the frequency range to be covered, which extends over several octaves, is divided into a plurality of sub-ranges. In lower sub-ranges, lumped constant circuits, such as conventional oscillatory circuits, are generally used. In higher sub-ranges, say from 500 to 2000 mc./s., distributed constant circuits, such as two-wire lines or wave-guides, are used. Thus several frequency sub-ranges are swept independently: this in fact amounts to having as many independent receivers as there are frequency sub-ranges. The corresponding equipment is therefore bulky and costly and information is not rapidly obtained.

It is an object of the invention to avoid these drawbacks.

A system according to the invention comprises means for translating the frequency range to be explored into the centimetre wave-length range and a tunable wide-band local oscillator for continuously sweeping the frequency range thus obtained. The beat frequency between the variable frequency signal derived from the tunable local oscillator and the frequency translated received signals whose frequency has been translated allow a rapid exploration of the frequency range concerned.

The invention will be best understood from the following description and appended drawings, wherein.

Figure 1:
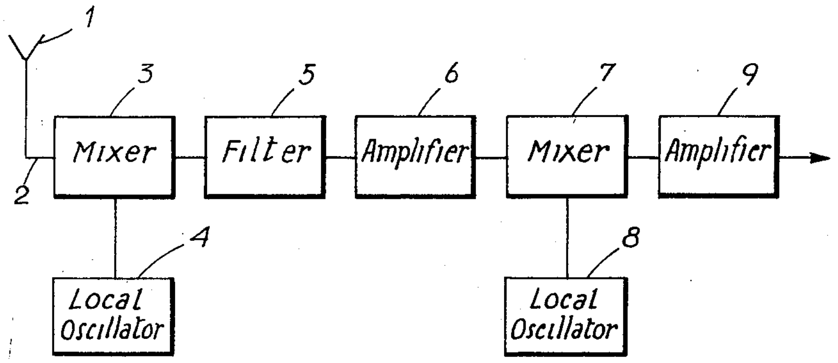
FIG. 1 is a block diagram of a system according to the invention.

Referring to FIG. 1, the signals to be detected are received on an aerial 1 and transmitted through a coaxial cable 2 to a crystal mixer 3. The latter also receives from a local oscillator 4 a first frequency signal of say 2500 mc./s.

If it is assumed that the frequency range to be surveyed extends from 50 to 1,500 mc./s., the signals derived at the output of mixer 3 will have a frequency comprised between 2550 and 4000 mc./s. on the one hand, and between 1000 and 2450 mc./s., on the other.

A filter 5 eliminates the signals having a frequency comprised between 1000 and 2450 mc./s. Thus, it is clear that the received signals are translated into the centimetric wave band with no interference from lower frequencies. Filter 5, which may be inserted into a wave-guide, may be followed by an amplifier, for example of the travelling-wave type.

The output signals of amplifier 6, which are comprised between 2550–4000 mc./s., are fed to a mixer 7 which also receives the output signal of an electronically-tunable, variable-frequency local oscillator 8, for instance of the type known as the 0 type "Carcinotron" (trademark registered by the assignee).

The frequency of the oscillator 8 may, for example, vary according to a saw-tooth pattern. Mixer 7 is followed by an intermediate frequency amplifier 9, which is, for example, centered on 750 mc./s. In order to eliminate the image frequency effect, the central frequency of amplifier 9 must be at least equal to half the band to be swept.

The frequency of oscillator 8 thus varies in the present case from 3300 to 4750 mc./s. (2550+750 mc./s. to 4000+750 mc./s.). Each signal transmitted in the surveyed band beats with the output signal of the local oscillator 8. This signal is then amplified and detected for utilization.

Figure 2:
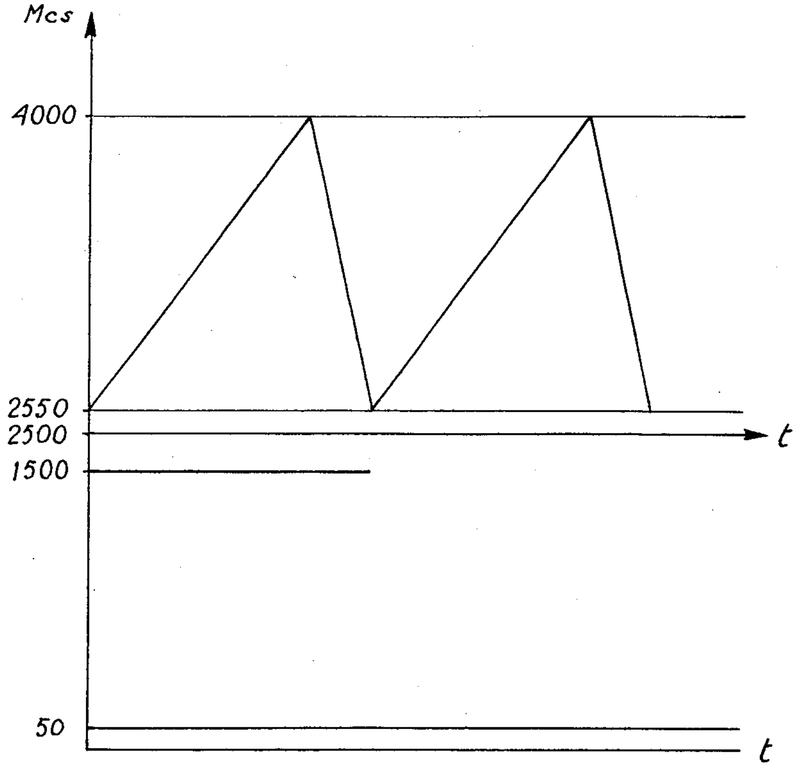
FIG. 2 is an explanatory diagram.

FIG. 2 shows, as a function of time, the frequency variation of the local oscillator 8 and the frequency band which is swept.

Of course, the respective locations of the variable-frequency and the fixed frequency local oscillators can be interchanged, the variable-frequency oscillator 8 being then located at the input of the system of FIG. 1.

Figure 3:
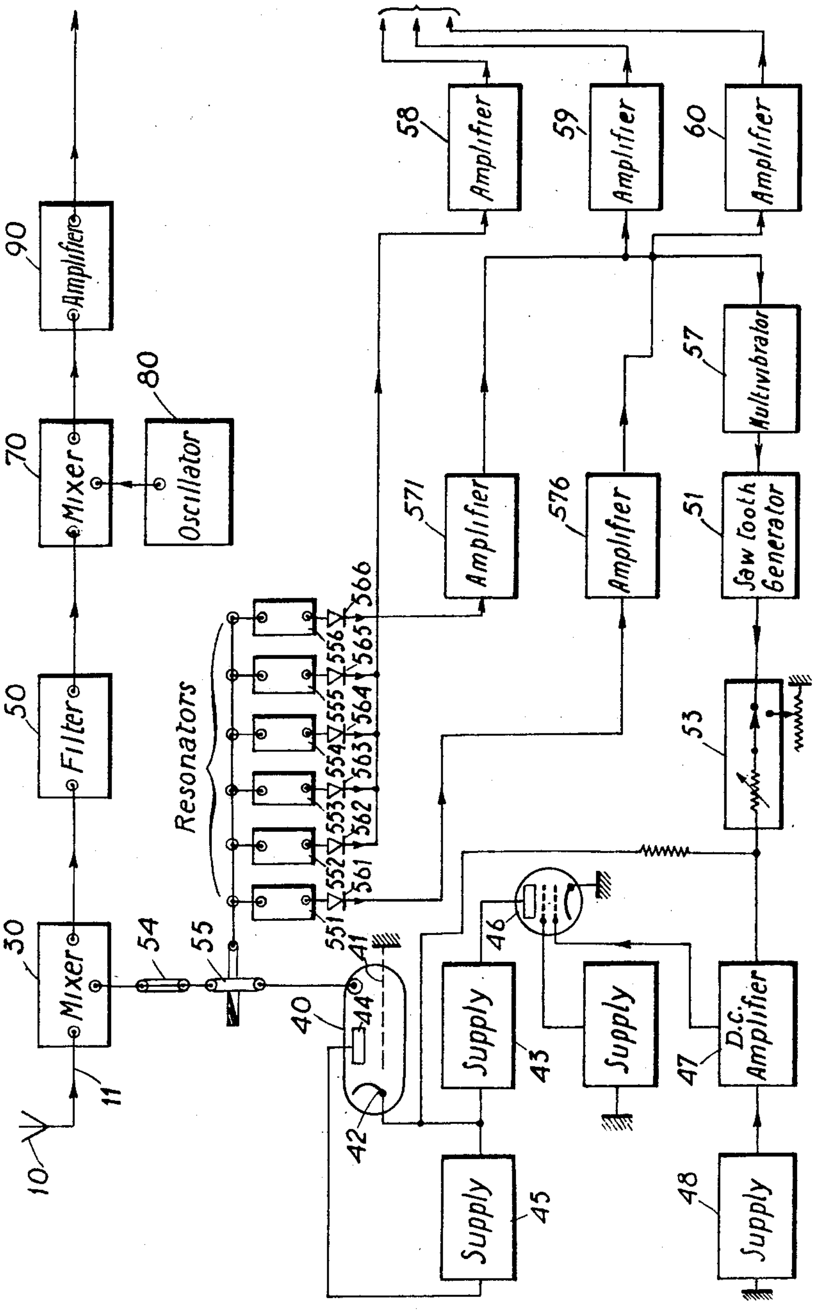
FIG. 3 is a more elaborated diagram of a system according to the invention.

FIG. 3 illustrates by way of example a more elaborate embodiment of a system of the invention wherein the variable frequency oscillator is located at the input.

The signals derived from aerial, or aerials, 10, are transmitted through a co-axial feeder 11 to a crystal mixer 30 which also receives the local oscillation signal from a "Carcinotron" tube 40. A beat signal, at the intermediate frequency of 1650 mc./s., is filtered at the output of mixer 30. This may be done either by means of a co-axial cavity amplifier stage, or, more simply, by means of a passive filter 50, without losses, also comprising a co-axial cavity, tuned to 1650 mc./s.

This filter is followed by a further crystal mixer 70 which receives a local wave at 1600 mc./s. from an osclllator 80 and furnishes an intermediate frequency of 50 mc./s. The 1650 mc./s. frequency is attenuated by filter 50 to 1650 mc./s., which thus serves as a separator between the two mixers.

The signals at 50 mc./s., are then amplified by an amplifier 90 and used for recording purposes.

As to the input mixer, it will be noted that the image frequencies are rejected, on account of the higher intermedate frequency. The image frequency band extends here from 3350 to 4800 mc./s. and will therefore be practically eliminated by the co-axal feeder and the input mixer.

The "Carcinotron" tube 40 has its delay line 41 grounded and its frequency is modulated by varying the potential between the cathode and the delay line. Its cathode 42 is fed from a supply 43 and its anode 44 from a supply 45.

Supply source 43 is connected to tube 46, the control grid of which is connected to a D.C. differential amplifier 47, the inputs of which are respectively connected to a supply 48 deliverng a reference voltage and to a scanning generator 51 delivering a saw-tooth voltage. A frequency band control 53 of the potentiometer type is connected in series between generator 51 and amplifier 47.

Cathode 42 is connected to the input of amplifier 47 by means of a resistance forming one branch of a divider bridge. This connection forms a feedback loop, and allows a control of the operating frequency of the "Carcinotron" to cause it to follow the frequency variation cycle.

The output of the "Carcinotron" tube is connected through a coaxial attenuator 54 to mixer 30. A coaxial coupler collects a portion of the output energy and feeds it to six cavity resonators 551 through 556, respectively tuned to 1700, 1750, 2050, 2450 and 3150 mc./s. Each one of these frequencies corresponds to one of the extreme frequencies of the frequency bands to be swept, each band extending over one octave.

The pulses delivered by the two extreme cavities 551 and 556 and rectified by rectifiers 561 and 566 are amplified and shaped by amplifiers 571 and 576 respectively and are applied to a bi-stable multivibrator 57 which controls the saw-tooth generator 51 and defines the beginning and the end of the sweeping periods. The two extreme frequencies are thus stabilized.

Resonators 552, 553, 554 and 555 which are followed by detectors 562 and 565 respectively, are connected to the input of an amplifier 58, for example of the cathode follower type. They provide synchronizing and marking signals. In a similar manner, amplifiers 59 and 60 are respectively coupled to resonators 551 and 556.

What is claimed, is:

A panoramic receiver for detecting the electromagnetic wave transmissions in a frequency band extending from high frequencies to super-high frequencies comprising: aerial means for receiving the waves to be detected; a backward wave travelling wave tube having a control electrode for varying the frequency thereof; a saw tooth voltage generator; means for connecting said generator to said control electrode; output means in said travelling wave tube for providing a first local wave having a variable frequency varying according to a saw tooth pattern; a first mixer for mixing said first local wave and said wave to be detected and for providing a variable frequency wave and having an output; means for connecting said first mixer to said aerial, and to said output means of said travelling wave tube; second fixed frequency local oscillator for providing a second fixed frequency local wave; a second mixer having two inputs respectively connected to said output of said first mixer, and to said second local oscillator for mixing said variable frequency wave and said second local wave; output means connected to said second mixer, a first and a second cavity resonators, respectively tuned to the extreme frequencies of said backward wave tube and further resonators respectively tuned to intermediate frequencies comprised between said extreme frequencies, said resonators being coupled to the output of said backward wave tube; a multivibrator for controlling said saw tooth voltage generator; a fixed voltage source, a differential amplifier connected to said fixed voltage source and to said saw tooth voltage generator and having an output; an electron tube having control means connected to said output of said differential amplifier and an anode; a fixed voltage source series connected between said anode of said electron tube and said control electrode of said backward wave tube; means for connecting to said multivibrator said first and second resonators; and output means coupled to said resonators.

References Cited in the file of this patent

UNITED STATES PATENTS

| | | |
|---|---|---|
| 2,572,216 | Taylor | Oct. 23, 1951 |
| 2,658,138 | Samuelson | Nov. 3, 1953 |
| 2,719,222 | Barr | Nov. 27, 1955 |
| 2,840,701 | Hurvitz | June 24, 1958 |
| 2,843,733 | Harrison | July 17, 1958 |